United States Patent
Niu et al.

(10) Patent No.: US 11,936,438 B2
(45) Date of Patent: Mar. 19, 2024

(54) INTERFERENCE FINDING METHOD AND APPARATUS, RECEIVING DEVICE, AND TRANSMITTING DEVICE

(71) Applicant: ZTE CORPORATION, Shenzhen (CN)

(72) Inventors: Li Niu, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 470 days.

(21) Appl. No.: 17/261,853

(22) PCT Filed: Jul. 12, 2019

(86) PCT No.: PCT/CN2019/095725
§ 371 (c)(1),
(2) Date: Jan. 20, 2021

(87) PCT Pub. No.: WO2020/015582
PCT Pub. Date: Jan. 23, 2020

(65) Prior Publication Data
US 2021/0297170 A1   Sep. 23, 2021

(30) Foreign Application Priority Data
Jul. 20, 2018   (CN) .......................... 201810802444.5

(51) Int. Cl.
*H04W 24/08*   (2009.01)
*H04B 17/345*  (2015.01)
*H04W 24/10*   (2009.01)

(52) U.S. Cl.
CPC .......... *H04B 17/345* (2015.01); *H04W 24/08* (2013.01); *H04W 24/10* (2013.01)

(58) Field of Classification Search
CPC ..... H04B 17/345; H04W 24/08; H04W 24/10
See application file for complete search history.

(56) References Cited

U.S. PATENT DOCUMENTS

| 10,708,028 B2 * | 7/2020 | Nam ................. H04W 72/0446 |
| 2006/0063492 A1 * | 3/2006 | Iacono ................. H04B 17/318 |
| | | 455/67.11 |

(Continued)

FOREIGN PATENT DOCUMENTS

| CN | 102724727 A | 10/2012 |
| CN | 104412519 A | 3/2015 |

(Continued)

OTHER PUBLICATIONS

Dec. 5, 2022 Korean Office Action from related KR 10-2021-7004982 (11 pgs).

(Continued)

*Primary Examiner* — Fahmida S Chowdhury
(74) *Attorney, Agent, or Firm* — Knobbe, Martens, Olson & Bear, LLP

(57) ABSTRACT

Provided are an interference finding method and apparatus, a receiving device, a transmitting device and a storage medium. The method includes: receiving measurement configuration information configured by a transmitting device; and performing, according to the measurement configuration information, a receiving measurement on a transmit beam associated with the measurement configuration information, where the receiving measurement includes a received signal strength indicator and/or a channel occupancy.

20 Claims, 2 Drawing Sheets

```
┌──────────────────────────────────────────────────────────┐
│ Receive measurement configuration information configured │ S201
│              by a transmitting device                    │
└──────────────────────────────────────────────────────────┘
                            │
                            ▼
┌──────────────────────────────────────────────────────────┐
│    Perform, according to the measurement configuration   │ S202
│  information, a receiving measurement on a transmit beam │
│  associated with the measurement configuration information│
└──────────────────────────────────────────────────────────┘
                            │
                            ▼
┌──────────────────────────────────────────────────────────┐
│ Determine a serviceable beam according to a measurement  │ S203
│          report of the receiving measurement             │
└──────────────────────────────────────────────────────────┘
```

(56) References Cited

U.S. PATENT DOCUMENTS

| | | | |
|---|---|---|---|
| 2012/0308239 A1* | 12/2012 | Sheth | H04B 10/1125 |
| | | | 398/131 |
| 2016/0150435 A1* | 5/2016 | Baek | H04B 7/0608 |
| | | | 370/252 |
| 2016/0338118 A1 | 11/2016 | Vajapeyam et al. | |
| 2017/0026938 A1* | 1/2017 | Onggosanusi | H04W 24/10 |
| 2017/0164375 A1 | 6/2017 | Sundararajan et al. | |
| 2017/0318491 A1 | 11/2017 | Chen et al. | |
| 2017/0324459 A1* | 11/2017 | Koskela | H04B 7/0617 |
| 2018/0132252 A1* | 5/2018 | Islam | H04W 72/542 |
| 2018/0176949 A1* | 6/2018 | Islam | H04B 7/088 |
| 2018/0199258 A1* | 7/2018 | Cezanne | H04B 7/0413 |
| 2018/0234912 A1* | 8/2018 | Islam | H04B 7/0695 |
| 2018/0262313 A1* | 9/2018 | Nam | H04L 5/0044 |
| 2018/0287860 A1* | 10/2018 | Xia | H04L 5/0023 |
| 2018/0368142 A1* | 12/2018 | Liou | H04W 74/0808 |
| 2019/0181932 A1* | 6/2019 | Jayawardene | H04W 72/046 |
| 2019/0182698 A1* | 6/2019 | Park | H04W 24/10 |
| 2020/0029297 A1* | 1/2020 | Baek | H04W 76/11 |
| 2021/0028847 A1* | 1/2021 | Bedekar | H04L 5/0037 |
| 2021/0119678 A1* | 4/2021 | Zhu | H04L 1/0003 |

FOREIGN PATENT DOCUMENTS

| | | |
|---|---|---|
| CN | 1078888307 | 4/2018 |
| CN | 108777842 A | 11/2018 |
| KR | 20160063020 | 6/2016 |
| KR | 20180008472 | 1/2018 |
| WO | WO 2016-119761 | 8/2016 |
| WO | WO 2017-076344 | 5/2017 |
| WO | WO 2018/056784 A1 | 3/2018 |
| WO | WO 2018-082064 | 5/2018 |

OTHER PUBLICATIONS

Australian Office Action dated Feb. 10, 2022 for Australian Patent Application No. 2019303683. 7 pages.
Extended European Search Report dated Mar. 23, 2022 for European Patent Application No. 19837242.7. 12 pages.
Qualcomm Incorporated: "Considerations of RLM and RLF in NR", 3GPP Draft; R2-1703563 RLM-RLF in NR, $3^{rd}$ generation partnership project (3GPP), Mobile Competence Centre. vol. RAN WG2, No. Spokane, USA; 20170403-20170407 Apr. 2, 2017.
CATT: "NR Radio Link Monitoring", 3GPP Draft; R1-1707467, $3^{rd}$ generation partnership project (3GPP), Mobile Competence Centre; vol. RAN WG1, No. Hangzhou; 20170515-20170519. May 14, 2017.
Nokia et al., "RRM and beam reporting", 3GPP Draft, R2-1704289 RRM and beam reporting, $3^{rd}$ generation partnership project (3FPP), mobile competence centre; vol. RAN WG2, No. Hangzhou, China; 20170515-20170519. May 14, 2017.
Samsung: "Beamforming related issues for NR-Unlicensed study item", 3GPP Draft; R2-1810560 Beamforming Related Issues for NR-Unlicensed Study Item, $3^{rd}$ Generation Partnership Project (3GPP), Mobile Competence Centre, vol. RAN WG2, No. Montreal, Canada; 20180702-20180706. Jul. 1, 2018.
International Search Report for PCT/CN2019/095725 dated Sep. 27, 2019.
Nokia, "RRM and bam reporting", 3GPP TSG-RAN WG2 Meeting #98, R2-1704289, Hangzhou, China, May 15-19, 2017.
Chinese first Search Report for Chinese Application No. 2018108024445 dated Oct. 31, 2023.
Chinese first Office Action for Chinese Application No. 201810802444.5 dated Oct. 31, 2023.

* cited by examiner

INTERFERENCE FINDING METHOD AND APPARATUS, RECEIVING DEVICE, AND TRANSMITTING DEVICE

CROSS-REFERENCE TO RELATED APPLICATIONS

This is a National Stage Application, filed under 35 U.S.C. 371, of and claims priority to International Patent Application No. PCT/CN2019/095725, filed on Jul. 12, 2019, which claims priority to Chinese Patent Application No. 201810802444.5 filed with the CNIPA on Jul. 20, 2018, the disclosures of which are incorporated herein by reference in their entireties.

TECHNICAL FIELD

The present application relates to the technical field of communications and, in particular, to an interference finding method and apparatus, a receiving device, and a transmitting device.

BACKGROUND

With the rapid growth of user data, the demand for spectrum is increasing. Allocated licensed spectrums are almost saturated, it is very difficult to allocate more spectrums, and the high cost of licensed spectrums means a high cost for the operator. The difference is that the unlicensed spectrum has very high flexibility in use, more frequency band choices and greater bandwidth.

Similar to the licensed spectrum, in order to improve the spectrum utilization and coverage, the beamforming technique may also be widely used for high-frequency unlicensed spectrums. For the beamforming, a transmitting device (such as a base station) uses multiple beams for transmission. When receiving, a receiving device (such as a terminal) may also use a receive beam to receive the transmit beam of the transmitting device, thus forming a corresponding relationship between the transmit beam and the receive beam.

In an unlicensed spectrum, due to the existence of the competition mechanism, the competition between transmitting devices becomes a kind of interference. When the operator uses the unlicensed spectrum as the serving bandwidth, the interference relationship is more complicated than that of the licensed spectrum. After adopting the beamforming technique, the interference measurement in the related art cannot satisfy the demand, and the interference on the beam cannot be found. The interference measurement manner in the related art cannot find the interference on the beam, no corresponding scheme has been proposed.

SUMMARY

The present application provides an interference finding method and apparatus, a receiving device, a transmitting device and a storage medium so as to at least solve that the interference cannot be distinguished at a beam level in the related art.

An interference finding method provided in the present disclosure includes steps described below.

Measurement configuration information configured by a transmitting device is received.

According to the measurement configuration information, a receiving measurement is performed on a transmit beam associated with the measurement configuration information, and the receiving measurement includes a received signal strength indicator and/or a channel occupancy.

An interference finding method provided in the present disclosure includes steps described below.

Measurement configuration information of a receiving device is configured.

The measurement configuration information is sent to the receiving device; the measurement configuration information is used for instructing the receiving device to perform a receiving measurement on a transmit beam associated with the measurement configuration information, and the receiving measurement includes a received signal strength indicator and/or a channel occupancy.

An interference finding apparatus provided in the present disclosure includes a reception module and a measurement module.

The reception module is configured to receive measurement configuration information configured by a transmitting device.

The measurement module is configured to perform, according to the measurement configuration information, a receiving measurement on a transmit beam associated with the measurement configuration information, where the receiving measurement includes a received signal strength indicator and/or a channel occupancy.

An interference finding apparatus provided in the present disclosure includes a configuration unit and a sending unit.

The configuration unit is configured to configure measurement configuration information of a receiving device.

The sending unit is configured to send the measurement configuration information to the receiving device; the measurement configuration information is used for instructing the receiving device to perform a receiving measurement on a transmit beam associated with the measurement configuration information, and the receiving measurement includes a received signal strength indicator and/or a channel occupancy.

A receiving device provided in the present disclosure includes a memory and a processor. The memory is configured to store a computer program. The processor executes the computer program to perform the above-mentioned method applied to the receiving device.

A transmitting device provided in the present disclosure includes a memory and a processor. The memory is configured to store a computer program. The processor executes the computer program to perform the above-mentioned method applied to the transmitting device.

A computer-readable storage medium is provided in the present disclosure, where the computer-readable storage medium is configured to store a first computer program and a second computer program.

The first computer program is executable by at least one processor to implement the above-mentioned method applied to the receiving device.

The second computer program is executable by at least one processor to implement the above-mentioned method applied to the transmitting device.

The present application implements the measurement technique of distinguishing the interference in the beam level, thereby not only helping the transmitting device and the receiving device to find a suitable service beam, but also helping the transmitting device and the receiving device to monitor the spectrum load.

DETAILED DESCRIPTION

Figure 1:
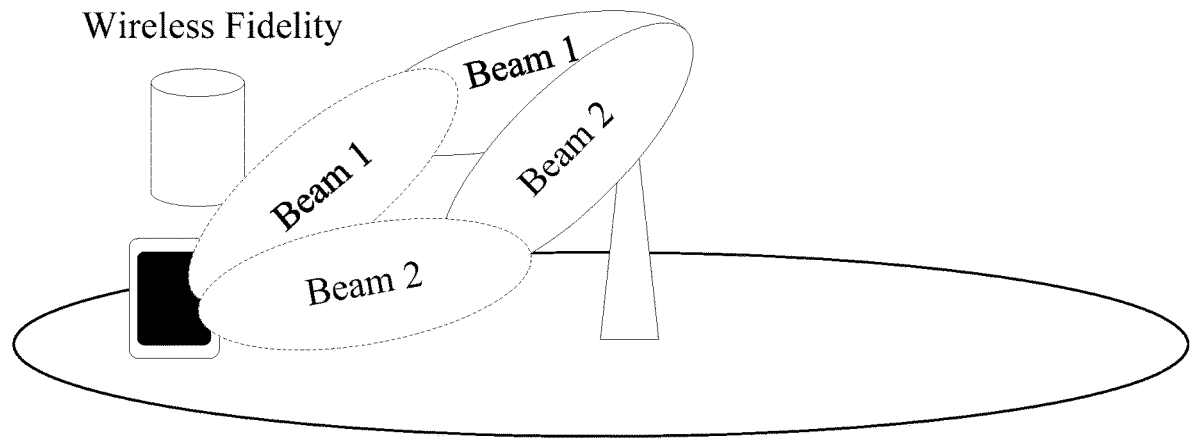
FIG. 1 is a schematic diagram of an interference finding method according to an embodiment one of the present disclosure.

With the rapid growth of user data, the demand for spectrums is increasing. At the same time, the allocated licensed spectrums are almost saturated, it is very difficult to allocate more spectrums, and the high cost of the licensed spectrums means the high cost for the operator. The difference is that the unlicensed spectrum has high flexibility in use, more frequency band selections and greater bandwidth, such as 2.4 gigahertz (GHz). Therefore, the use of the unlicensed spectrums to provide services for users is becoming an option of the operator. However, since the unlicensed spectrum is a shared spectrum, the user must obtain the right to use of the spectrum through competition. That is, the user needs to preempt the spectrum before sending data. If the preemption is successful, the data may be sent; otherwise, it will continue to wait for a next success. The mechanism of preempting the spectrum must be fair. In view of this, some standards in the related art have introduced a "listen before talk" (LBT) mechanism. Before sending data, a sending-end device monitors or perceives whether a channel is idle or busy. If the channel is idle, the sending-end device may use the channel to send the data, and if the channel is busy, the sending-end device cannot send the data. The listen before talk is a technique of carrier sense multiple access (CSMA), which is also referred to as listen before talk.

It is inferred from this that in the unlicensed spectrum, due to the existence of the competition mechanism, the competition between nodes becomes a kind of interference. When the operator uses the unlicensed spectrum as a serving bandwidth, an interference relationship is more complicated than that of the licensed spectrum. For example, the competition relationship exists between a base station and a wireless fidelity (WIFI), between a terminal and the WIFI, between base stations, between a base station and a terminal, and between terminals. In addition, since the frequency coverage is small, such as the WIFI, these competition relationships may only be perceived by surrounding nodes. For example, WIFI nodes exist near the terminal, and the base station may not be able to find the WIFI nodes surrounding the terminal and schedules the terminal to send the data. But due to the WIFI interference or competition, the terminal receives relatively bad interference and cannot even obtain the use of the spectrum, and the WIFI nodes are hidden nodes for the base station.

Two measurement quantities are introduced into some standards, and the two measurement quantities include a received signal strength indicator (RSSI) and a channelOccupancy. At each measurement moment/symbol, the terminal measures all received power (including co-channel signals, adjacent channel interference, thermal noise, etc.) on a measurement frequency band to obtain an RSSI value. Within a duration, the terminal calculates an average of RSSI values to obtain the measurement quantity, the RSSI, and calculates the percentage of RSSI sample values greater than a threshold to obtain the measurement quantity, the channelOccupancy. The measurement quantity, the RSSI, may measure the magnitude of interference which may be experienced in the spectrum. Assuming that the terminal reports the RSSI value, if the base station determines that the terminal is in relatively great interference, the base station may instruct a spectrum with relatively small interference to the terminal. The measurement quantity, the channelOccupancy, may measure a preemption probability of the spectrum. Assuming that the terminal reports the channelOccupancy, if the base station determines that it is difficult for the terminal to preempt the spectrum, the base station may instruct a spectrum which is easier to be preempted for the terminal.

At the same time, a high-frequency unlicensed spectrum may also be applied to actual network deployment scenarios, especially in 5 GHz, 37 GHz and 60 GHz, there is very large available bandwidth. Similar to the licensed spectrum, in order to improve the spectrum utilization and coverage, the beamforming technique may also be widely used for the high-frequency unlicensed spectrum. For the beamforming, the base station uses a plurality of beam directions for performing transmission. For a terminal, in receiving, a receive beam may also be used to receive a transmit beam of a node, thus, a corresponding relationship between the transmit beam and the receive beam is formed. It can be seen that each pair of the transmit beam and the receive beam may have an independent interference relationship.

However, after adopting the beamforming technique, the measurement quantities, the RSSI and the channelOccupancy, in the related art cannot satisfy the demand. For example, in the scenario of FIG. 1, the RSSI measurement and channelOccupancy measurement in the related art cannot find that the terminal has WIFI interference in the direction of beam 1, moreover, there is no interference in other beam directions. So, an introduction of measurement quantities in the beam level is considered to find interference on the beam and help the base station and the terminal to find a suitable service beam. Based on this, in order to facilitate the receiving device and the transmitting device to distinguish the interference of the beam, the transmitting device may configure the receiving device to perform a receiving measurement on a transmit beam, and the receiving device performs the receiving measurement on the transmit beam according to the corresponding receive beam.

Exemplary embodiments of the present disclosure will be described in detail with reference to the drawings. The drawings illustrate the exemplary embodiments of the present disclosure, but it should be understood that the present disclosure may be implemented in various ways and should not be limited to the embodiments set forth herein. On the contrary, these embodiments are provided for a thorough understanding of the present disclosure and to fully convey the scope of the present disclosure to those skilled in the art.

Prefixes such as "module", "part" or "unit" used to indicate elements in the subsequent description are merely used to facilitate the description of the present application, and have no particular meaning in themselves. Therefore, "module", "part" or "unit" may be used in a mixed manner.

Prefixes such as "first" and "second" used to distinguish elements are merely used to facilitate the description of the present application, and have no particular meaning in themselves.

Figure 2:
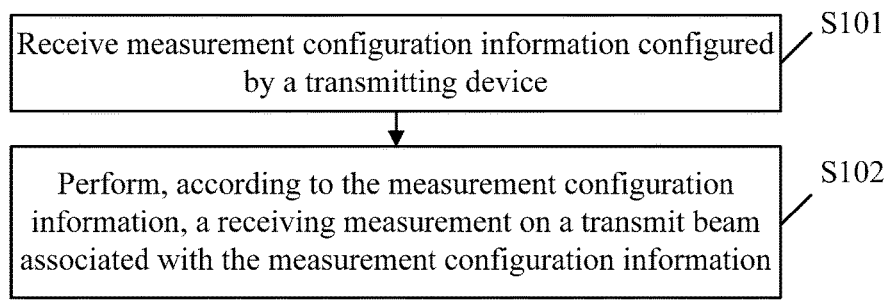
FIG. 2 is a flowchart of an interference finding method according to the embodiment one of the present disclosure.

An embodiment of the present disclosure provides an interference finding method. As shown in FIG. 2, the method includes steps described below.

In step S101, measurement configuration information configured by a transmitting device is received.

In step S102, according to the measurement configuration information, a receiving measurement is performed on a transmit beam associated with the measurement configuration information, and the receiving measurement includes a received signal strength indicator and/or a channel occupancy.

The method in the embodiment of the present disclosure is applied to a receiving device, where the receiving device may also be described as a receiving-end device, may be a terminal in a communication system; and the transmitting device may also be described as a sending-end device, and may be a base station or a node in the communication system.

In the embodiment of the present disclosure, according to the measurement configuration information configured by the transmitting device, the receiving measurement is performed on the transmit beam associated with the measurement configuration information, so that the measurement technique for distinguishing interference in the beam level is achieved, thereby helping the transmitting device and the receiving device to find a suitable service beam, and also helping the transmitting device and the receiving device to monitor the spectrum load.

For example, using an example of the transmitting device and the receiving device respectively being a base station and a terminal, in order to facilitate the terminal and the base station to distinguish the interference of the beam, the base station may configure the terminal to perform the measurement on a transmit beam, and the terminal will perform the receiving measurement on a transmit beam according to the corresponding receive beam. The transmit beam may be identified by related information of the transmit beam, where the related information of the transmit beam may be a beam identifier (ID)/synchronization broadcast block (SSB) index/channel state information reference signal (CSI-RS) resource ID, etc., corresponding to the transmit beam.

First, the base station may configure the terminal to perform the RSSI and/or channelOccupancy measurement on a transmit beam, and the configured measurement configuration information is associated with the beam ID/SSB index/CSI-RS resource ID, etc., that is, the associated transmit beam may be represented by the related information of the transmit beam. The CSI-RS represents a channel state information reference signal, and the SSB represents a synchronous broadcast block. The measurement configuration information includes a measurement configuration, and/or a measurement object configuration, and/or a measurement report configuration, and/or a management configuration, and/or a radio link monitoring (RLM) configuration; where the measurement configuration may be a configuration of a measurement parameter.

In some embodiments, the measurement object configuration information, for a frequency point, may include an association relationship between the RSSI and/or the channel occupancy measurement configuration and beam ID/SSB index/CSI-RS resource ID, etc., may also include the related information of the transmit beam, such as the beam ID/SSB index/CSI-RS resource ID, and includes a measurement parameter of the receiving measurement, such as a measurement moment/symbol (including a period, an offset, a duration, etc.).

In other words, the measurement object configuration information may include at least one of: an association relationship between the related information of the transmit beam and the measurement configuration; the related information of the transmit beam; or the measurement parameter of the receiving measurement.

In detail, 1. in the measurement object configuration, associated transmit beams correspond to different measurement configurations; for example, the beam ID/SSB index/CSI-RS resource ID, etc. correspond to different RSSI measurement configurations and/or different channelOccupancypaney measurement configurations. Assuming that the RSSI measurement configuration and/or channel occupancy measurement configuration is a list, and each item in the list is one measurement configuration, where in each measurement configuration, an identifier is defined and associates the candidate beam ID/SSB index/CSI-RS resource ID, etc. with the measurement moment/symbol. The candidate beam ID/SSB index/CSI-RS resource ID, etc. may have a one-to-one correspondence with the measurement moment/symbol, and each associated beam ID/SSB index/CSI-RS resource ID, etc. may be configured with a different measurement moment/symbol.

2. In the measurement object configuration, the associated transmit beams correspond to a same measurement configuration; for example, the beam ID/SSB index/CSI-RS resource ID, etc. corresponds to a same RSSI and/or channel occupancy measurement configuration. Assuming that the RSSI and/or channel occupancy measurement configuration includes all candidate beam IDs/SSB indexes/CSI-RS resource IDs, etc., the candidate beam IDs/SSB indexes/CSI-RS resource IDs, etc. may be a list, and all the candidate beam IDs/SSB indexes/CSI-RS resource IDs, etc. are configured with a same measurement moment/symbol.

3. In the measurement object configuration, the base station may not configure the associated beam IDs/SSB indexes/CSI-RS resource IDs, etc., but it is determined by the beam ID/SSB index/CSI-RS resource ID, etc. notified by system information or by the beam ID/SSB index/CSI-RS resource ID, etc. which may be measured and detected by the terminal.

4. In the RSSI and/or the channel occupancy measurement configuration, a node may not configure the associated beam ID/SSB index/CSI-RS resource ID, etc., but it is determined by a reference signal configuration measured by reference signal receiving power (RSRP)/reference signal receiving quality (RSRQ)/a signal to interference plus noise ratio (SINR). The RSRP represents the reference signal receiving power, the RSRQ represents the reference signal receiving quality and the SINR represents the signal to interference plus noise ratio.

In some embodiments, the base station configures also in the measurement report configuration that the terminal reports the measurement report associated with the beam ID/SSB index/CSI-RS resource ID, etc.

The measurement report may include that:
1. whether to report the measurement report based on the beam ID/SSB index/CSI-RS resource ID, etc.;
2. the terminal reports the N best measurement results, where N is a maximum number, configured by the base station, of measurement results which need to be reported; and
3. the terminal reports the M best measurement results, where M is a number, configured by the base station, of measurement results greater than a threshold value, and the threshold value is configured by the node.

In some embodiments, in the measurement report configuration, the base station configures the terminal to perform periodic measurement reporting. For example, in the measurement report configuration, the node configures the terminal to perform an event triggering measurement reporting. For each measurement result associated with the beam ID/SSB index/CSI-RS resource ID, etc., the event which may be configured includes one of:
1. an entering condition: an RSSI result of a serving beam is less than a corresponding threshold; and a leaving condition: the RSSI result of the serving beam is greater than a corresponding threshold;
2. an entering condition: a channelOccupancy result of the serving beam is less than a corresponding threshold; and a leaving condition: the channelOccupancy result of the serving beam is greater than a corresponding threshold;
3. an entering condition: the RSSI result of the serving beam is less than a corresponding threshold 1, and the channelOccupancy result of the serving beam is less than a corresponding threshold 2; and a leaving condition: the RSSI result of the serving beam is greater than the corresponding threshold 1, and the channelOccupancy result of the serving beam is greater than the corresponding threshold 2; or
4. an entering condition: an RSRP/RSRQ result of the serving beam is greater than the corresponding threshold 1, the RSSI result of the serving beam is less than the corresponding threshold 2, and the channelOccupancy result of the serving beam is less than a corresponding threshold 3; and a leaving condition: the RSRP/RSRQ result of the serving beam is less than the corresponding threshold 1, or the RSSI result of the serving beam is greater than the corresponding threshold 2, or the channelOccupancy result of the serving beam is greater than the corresponding threshold 3.

In some embodiments, in the measurement report configuration, the base station configures the terminal to perform aperiodic measurement reporting/one-time measurement reporting.

The base station may urge the terminal to perform the receiving measurement and report the measurement result through a media access control (MAC)/physical (PHY) command.
1. The MAC/PHY command carries the beam ID/SSB index/CSI-RS resource ID, etc., where the beam ID/SSB index/CSI-RS resource ID, etc., is the association relationship in the above-mentioned measurement object configuration; and
2. the MAC/PHY command defaults that the terminal measures all the beam IDs/SSB indexes/CSI-RS resource IDs, etc., or that the terminal detects and identifies beam IDs/SSB indexes/CSI-RS resource IDs, etc.

After receiving the measurement configuration, the terminal performs the RSSI and/or channel occupancy measurement according to the associated beam ID/SSB index/CSI-RS resource ID, etc. In other words, in some embodiments, after the receiving measurement is performed according to the measurement configuration information on the transmit beam associated with the measurement configuration information, the method may include a step described below.

A measurement report which is associated with the transmit beam and obtained according to the receiving measurement is reported.

In some embodiments, the base station further configures the terminal to measure beam directions corresponding to a beam ID/SSB index/CSI-RS resource ID, etc.; and the terminal measures all received power at the corresponding beam direction and the corresponding measurement moment (including the period, the offset, the duration, etc.) to obtain RSSI sample values in these beam directions, and then processes for each beam respectively to obtain the RSSI and/or channel occupancy value of each beam.

In some embodiments, the terminal may also trigger and report the RSSI and/or channel occupancy value of the beam level according to the measurement object configuration and the measurement report configuration.

The triggering condition may include:
1. satisfying a periodic reporting condition;
2. satisfying an event triggering reporting condition, assuming that a measurement result satisfies the entering condition of a measurement event, the measurement reporting is triggered; alternatively, assuming that a measurement result satisfies the leaving condition of the measurement event, the measurement reporting is triggered; and
3. satisfying a one-time reporting condition, which may be one measurement that has just been completed.

In some embodiments, the measurement report may include at least one of the measurement results described below.
1. The terminal reports N best measurement results of RSSI and/or channel occupancy measurement results. The terminal sorts the RSSI and/or channel occupancy value of each beam and selects N highest RSSI and/or channel occupancy measurement results from the measurement values.
2. The terminal reports N best measurement results of RSRP/RSRQ measurement results. The terminal sorts the RSRP/RSRQ value of each beam and selects N RSSI and/or channel occupancy measurement results corresponding to N beams having N highest RSRP/RSRQ measurement values.
3. The terminal reports M best measurement results of the RSSI and/or channel occupancy measurement results. The terminal sorts the RSSI and/or channel occupancy value of each beam and selects M highest RSSI and/or channel occupancy measurement results having measurement values greater than a threshold value.
4. The terminal reports M best measurement results of the RSRP/RSRQ measurement results. The terminal sorts the RSRP/RSRQ value of each beam and selects M RSSI and/or channel occupancy measurement results corresponding to M beams having the highest RSRP/RSRQ measurement values greater than a threshold value.
5. The terminal reports RSSI and/or channel occupancy measurement results of all beams.
6. The terminal reports RSSI and/or channel occupancy measurement results of the detected beams.
7. The terminal reports RSSI and/or channel occupancy measurement results satisfying the RSSI and/or channel occupancy event condition.

In some embodiments, the measurement results may include the beam ID/SSB index/CSI-RS resource ID, etc. associated with the measurement result of each beam, for example:
1. the associated beam ID/SSB index/CSI-RS resource ID, etc. in the measurement configuration;
2. an identifier defined in the measurement configuration, and the identifier is associated with the candidate beam ID/SSB index/CSI-RS resource ID, etc.;

3. the beam ID/SSB index/CSI-RS resource ID, etc. detected by the terminal; and
4. the terminal does not report the beam ID/SSB index/CSI-RS resource ID, etc., and reports in a default order, where the default order may be an order of the beam ID/SSB index/CSI-RS resource ID, etc. from low to high.

The above measurement results of the beam levels may be reported by the terminal to a high layer of the terminal or to the base station.

In some embodiments, after the receiving measurement is performed according to the measurement configuration information on the transmit beam associated with the measurement configuration information, the method may include a step described below.

Radio link quality is evaluated according to a measurement report obtained based on the receiving measurement.

In some embodiments, the step in which the radio link quality is evaluated according to the measurement report obtained based on the receiving measurement may include a step described below.

It is determined to be out-of-synchronization in a case where the measurement report obtained according to the receiving measurement satisfies one of the following conditions.

During an evaluation period, the received signal strength indicator obtained according to the receiving measurement is greater than a first received signal strength threshold value; or during the evaluation period, the channel occupancy obtained according to the receiving measurement is greater than a first channel occupancy threshold value.

In some embodiments, after the receiving measurement is performed according to the measurement configuration information on the transmit beam associated with the measurement configuration information, the method may also include a step described below.

A serviceable beam is determined according to the measurement report obtained based on the receiving measurement, where the serviceable beam satisfies one of the following conditions.

The received signal strength indicator obtained according to the receiving measurement is not greater than a second received signal strength threshold value; or the channel occupancy obtained according to the receiving measurement is not greater than a second channel occupancy threshold value.

Embodiment Two

Figure 3:
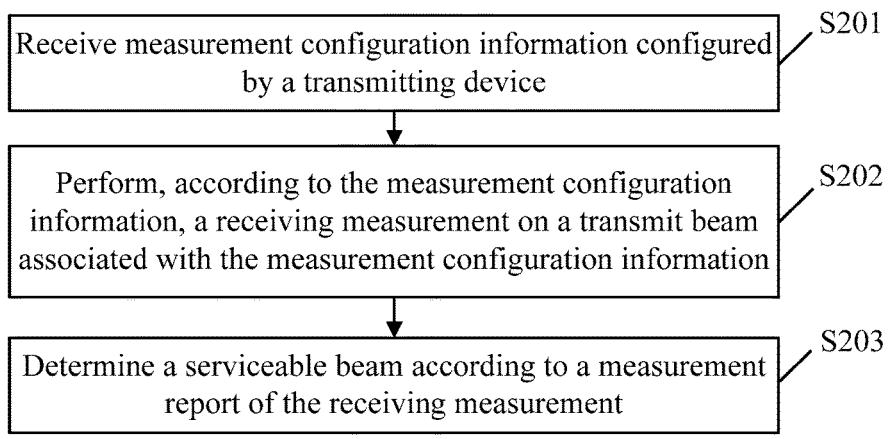
FIG. 3 is a flowchart of an interference finding method according to an embodiment two of the present disclosure.

An embodiment of the present disclosure provides an interference finding method. As shown in FIG. 3, the method includes steps described below.

In step S201, measurement configuration information configured by a transmitting device is received.

In step S202, according to the measurement configuration information, a receiving measurement is performed on a transmit beam associated with the measurement configuration information, and the receiving measurement includes a received signal strength indicator and/or a channel occupancy.

In step S203, a serviceable beam is determined according to the measurement report of the receiving measurement, and the serviceable beam satisfies one of the following conditions:

the received signal strength indicator obtained according to the receiving measurement is not greater than a second received signal strength threshold value; or the channel occupancy obtained according to the receiving measurement is not greater than a second channel occupancy threshold value.

For example, for the beam management in the related art, the terminal selects the optimal beam based on a layer 1-RSRP (L1-RSRP). However, the L1-RSRP may only determine the signal quality of the transmit beam and cannot determine the interference in the beam direction. Therefore, for the beam management, a beam with small interference may also be selected according to the RSSI and/or channelOccupancy measurement in the beam direction.

First, the base station configures the RSSI/channelOccupancy for the management configuration of the beam management. In detail, in some embodiments, the base station configures whether the RSSI and/or channelOccupancy are required for the beam management.

In some embodiments, the base station configures on which candidate beams of the terminal the RSSI and/or channelOccupancy measurement needs to be performed. Alternatively, the base station configures the moment/symbol of measuring the RSSI and/or channelOccupancy, such as the period, offset, and duration. Different moments/symbols of the RSSI and/or channelOccupancy may be configured for different candidate beams, or a same moment/symbol of the RSSI and/or channelOccupancy may be configured for different candidate beams.

For example, the base station configures an RSSI threshold 1 (i.e., the second received signal strength threshold value) and/or a channelOccupancy threshold 2 (i.e., the second channel occupancy threshold value) for the candidate beam.

The base station may also configure the terminal to report the configuration of the RSSI and/or channel occupancy, where the configuration of the RSSI and/or channel occupancy includes a report type, periodic or aperiodic, a reported period of a physical uplink control channel (PUCCH), a timeslot, a symbol, and a reported frequency domain position of the PUCCH.

The base station may also instruct the terminal to report the RSSI and/or channelOccupancy of the candidate beam through a MAC control element (CE)/physical downlink control channel (PDCCH).

After the terminal receives these configurations, if the terminal is configured to perform the RSSI and/or channel occupancy measurement, the terminal performs the RSSI and/or channel occupancy measurement on the candidate beam at the measurement moment/symbol to obtain the measurement result.

Moreover, the serviceable beam is selected according to the threshold configured by the base station. The condition may be one of that:
1. the RSSI of a beam is less than a corresponding RSSI threshold value (i.e., the second received signal strength threshold value);
2. the channelOccupancy of a beam is less than a corresponding channelOccupancy threshold value (i.e., the second channel occupancy threshold value);
3. the RSSI of a beam is less than the corresponding RSSI threshold value 1 (i.e., the second received signal strength threshold value), and the channelOccupancy of the beam is less than the corresponding channelOccupancy threshold value 2 (i.e., the second channel occupancy threshold value);
4. the RSRP of a beam is greater than a corresponding RSRP threshold value 1 (i.e., the second received signal strength threshold value), and the RSSI is less than the corresponding RSSI threshold value 2;

5. the RSRP of a beam is greater than the corresponding RSRP threshold value 1 (i.e., the second received signal strength threshold value), and the channelOccupancy is less than a corresponding channelOccupancy threshold value 2 (i.e., the second channel occupancy threshold value); or 6. the RSRP of a beam is greater than the corresponding RSRP threshold value 1, the RSSI is less than the corresponding RSSI threshold value 2 (i.e., the second received signal strength threshold value), and the channelOccupancy is less than a corresponding channelOccupancy threshold value 3 (i.e., the second channel occupancy threshold value).

If the condition is satisfied, the terminal determines the beam to be the serviceable beam.

In some embodiments, the terminal may synthesize a cell-level RSSI through the RSSI of the beam level.

The terminal obtains the RSSI and/or channelOccupancy of each beam through the measurement. Several beam results may be selected according to the configuration of the node to obtain the RSSI and/or channelOccupancy representing the cell level. There are some examples.

First, the base station configures/broadcasts a value of N.

Certainly, the base station may not configure/broadcast the value of N, and a default value of N is the number of all beams.

The base station may further configure/broadcast a threshold value.

Then, after receiving, the terminal selects some beam results from all the beam results to obtain an average value of these selected beams, and then obtains the RSSI and/or channelOccupancy of the cell level.

For example, the beam results may be selected according to at least one of the following conditions: selecting N beams with the best measurement results; selecting all beams; selecting beams that are greater than a threshold value; selecting beams with RSRPs greater than a threshold; or selecting beams with the N best measurement results in the RSRP values.

Embodiment Three

Figure 4:
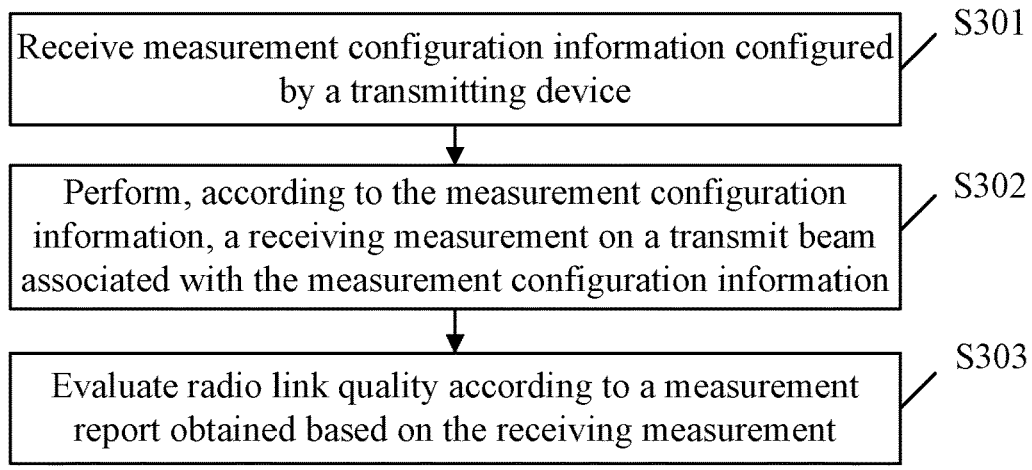
FIG. 4 is a flowchart of an interference finding method according to an embodiment three of the present disclosure.

An embodiment of the present disclosure provides an interference finding method. As shown in FIG. 4, the method includes the steps described below.

In step S301, measurement configuration information configured by a transmitting device is received.

In step S302, according to the measurement configuration information, a receiving measurement is performed on a transmit beam associated with the measurement configuration information, and the receiving measurement includes a received signal strength indicator and/or a channel occupancy.

In step S303, radio link quality is evaluated according to a measurement report obtained based on the receiving measurement.

In some embodiments, the step in which the radio link quality is evaluated according to the measurement report obtained based on the receiving measurement may include a step described below.

It is determined to be out-of-synchronization in a case where the measurement report obtained according to the receiving measurement satisfies one of the following conditions:

during an evaluation period, the received signal strength indicator obtained according to the receiving measurement is greater than a first received signal strength threshold value, or during the evaluation period, the channel occupancy obtained according to the receiving measurement is greater than a first channel occupancy threshold value.

In other words, after receiving the RLM configuration in the measurement configuration information, the terminal performs the radio link monitoring (RLM) to evaluate the radio link quality, thereby monitoring interference of a carrier and the probability of preempting the carrier.

The RLM configuration may include the interference of the carrier and the probability of preempting the carrier.

For example, the RLM configuration performed by the base station includes at least one of:

The base station may configure the terminal to monitor the interference of the carrier and the probability of preempting the carrier.

The base station may also configure whether the terminal is to monitor the interference of the carrier and the probability of preempting the carrier.

The base station may also configure the moment/symbol, including period, offset, duration, etc., measured by the terminal during the RLM; for example, each radio link monitoring reference signal (RLM-RS) has a different measurement moment/symbol; as another example, all RLM-RSs have a same measurement moment/symbol.

The base station configures an RSSI threshold for instructing the out-of-synchronization.

The base station configures a channelOccupancy threshold for instructing the out-of-synchronization.

The base station configures an RSSI threshold for instructing synchronization.

The base station configures a channelOccupancy threshold for instructing synchronization.

After receiving the configuration information, the terminal performs the RLM.

In some embodiments, assuming that there are a plurality of measurement moments/symbols in the evaluation period of the RLM, the terminal may calculate the RSSI and/or the channel occupancy respectively at each measurement moment/symbol. If all RSSIs in the evaluation period are greater than the corresponding RSSI threshold value 1 (i.e., the first received signal strength threshold value), and/or, all channelOccupancies are greater than the corresponding channelOccupancy threshold value 2 (i.e., the first channel occupancy threshold value), the out-of-synchronization is instructed to the high layer.

In some embodiments, assuming that there are a plurality of measurement moments/symbols in the evaluation period of the RLM, the terminal may calculate the RSSI and/or the channel occupancy respectively at each measurement moment/symbol. If all RSSIs in the evaluation period are greater than the corresponding RSSI threshold value 1 (i.e., the first received signal strength threshold value), and/or, all channelOccupancies are greater than the corresponding channelOccupancy threshold value 2 (i.e., the first channel occupancy threshold value), and the radio link quality is less than the corresponding quality threshold value 3, the out-of-synchronization is instructed to the high layer.

In some embodiments, assuming that there are a plurality of measurement moments/symbols in the evaluation period of the RLM, the terminal calculates one RSSI and one channelOccupancy at all measurement moments/symbols. If the RSSI is greater than the corresponding RSSI threshold value 1 (i.e., the first received signal strength threshold value), and/or, the channelOccupancy is greater than the corresponding channelOccupancy threshold value 2 (i.e., the first channel occupancy threshold value), the out-of-synchronization is instructed to the high layer.

In some embodiments, assuming that there are a plurality of measurement moments/symbols in the evaluation period of the RLM, the terminal calculates one RSSI and one channelOccupancy at all measurement moments/symbols. If the RSSI is greater than the corresponding RSSI threshold value 1 (i.e., the first received signal strength threshold value), and/or, the channelOccupancy is greater than the corresponding channelOccupancy threshold value 2 (i.e., the first channel occupancy threshold value), and the radio link quality is less than the corresponding quality threshold value 3, the out-of-synchronization is instructed to the high layer.

In some embodiments, assuming that there are a plurality of measurement moments/symbols in the evaluation period of the RLM, the terminal may calculate the RSSI and/or the channel occupancy respectively at each measurement time/symbol. If all RSSIs in the evaluation period are less than the corresponding RSSI threshold value 1 (i.e., the first received signal strength threshold value), and/or, all channelOccupancies are less than the corresponding channelOccupancy threshold value 2 (i.e., the first channel occupancy threshold value), the synchronization is instructed to the high layer.

In some embodiments, assuming that there are a plurality of measurement moments/symbols in the evaluation period of the RLM, the terminal may calculate the RSSI and/or the channel occupancy respectively at each measurement time/symbol. If all RSSIs in the evaluation period are less than the corresponding RSSI threshold value 1 (i.e., the first received signal strength threshold value), and/or, all channelOccupancies are less than the corresponding channelOccupancy threshold value 2 (i.e., the first channel occupancy threshold value), and the radio link quality is greater than the corresponding quality threshold value 3, the synchronization is instructed to the high layer.

In some embodiments, assuming that there are a plurality of measurement moments/symbols in the evaluation period of the RLM, the terminal calculates one RSSI and one channelOccupancy at all measurement moments/symbols. If the RSSI is less than the corresponding RSSI threshold value 1 (i.e., the first received signal strength threshold value), and/or, the channelOccupancy is less than the corresponding channelOccupancy threshold value 2 (i.e., the first channel occupancy threshold value), the synchronization is instructed to the high layer.

In some embodiments, assuming that there are a plurality of measurement moments/symbols in the evaluation period of the RLM, the terminal calculates one RSSI and one channelOccupancy at all measurement moments/symbols. If the RSSI is less than the corresponding RSSI threshold value 1 (i.e., the first received signal strength threshold value), and/or, the channelOccupancy is less than the corresponding channelOccupancy threshold value 2 (i.e., the first channel occupancy threshold value), and the radio link quality is greater than the corresponding quality threshold value 3, the synchronization is instructed to the high layer.

Certainly, an out-of-synchronization instruction may carry a reason, for example, the monitored interference is relatively large, and/or the preempting probability of the carrier is relatively small, and/or the RSSI is relatively large, and/or the channelOccupancy is relatively large.

If the terminal receives N out-of-synchronization instructions continuously for a period of time, and the carried reason is that the monitored interference is relatively large, and/or the preempting probability of the carrier is relatively small, and/or the RSSI is relatively large, and/or the channelOccupancy is relatively large, a carrier selection may be triggered.

Embodiment Four

Figure 5:
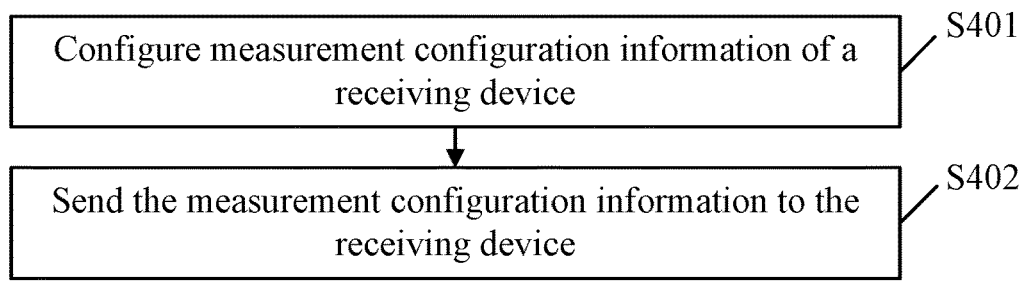
FIG. 5 is a flowchart of an interference finding method according to an embodiment four of the present disclosure.

An embodiment of the present disclosure provides an interference finding method. As shown in FIG. 5, the method includes steps described below.

In step S401, measurement configuration information of a receiving device is configured.

In step S402, the measurement configuration information is sent to the receiving device; the measurement configuration information is used for instructing the receiving device to perform a receiving measurement on a transmit beam associated with the measurement configuration information, and the receiving measurement includes a received signal strength indicator and/or a channel occupancy.

The method in the embodiment of the present disclosure is applied to a transmitting device, where the receiving device may also be described as a receiving-end device, may be a terminal in a communication system; and a transmitting device may also be described as a sending-end device, and may be a base station or a node in the communication system.

In the embodiment of the present disclosure, the measurement configuration information of the receiving device is configured, and the measurement configuration information is sent to the receiving device, so that the terminal may be instructed to perform the receiving measurement on the transmit beam associated with the measurement configuration information, the measurement technology for distinguishing interference in the beam level is achieved, thereby helping the transmitting device and the receiving device to find a suitable service beam, and also helping the transmitting device and the receiving device to monitor the spectrum load.

In some embodiments, after sending the measurement configuration information to the receiving device, the method includes a step described below.

A measurement report which is associated with the transmit beam and reported by the receiving device is received.

In some embodiments, the method further includes a step described below.

A threshold value for the receiving device evaluating radio link quality is configured, where the threshold value of the radio link quality includes a first received signal strength threshold value and/or a first channel occupancy threshold value.

In some embodiments, the method further includes a step described below.

A threshold value for the receiving device evaluating the transmit beam is configured, where the threshold value of the transmit beam includes a second received signal strength threshold value and/or a second channel occupancy threshold value.

When this embodiment of the present disclosure is specifically implemented, reference may be made to the description of the base station side in the embodiments one to three, and this embodiment has the corresponding technical effects.

Embodiment Five

Figure 6:
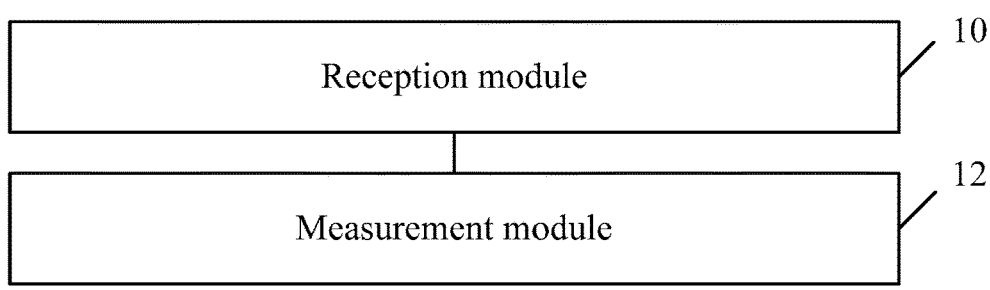
FIG. 6 is a structural diagram of a receiving device according to an embodiment five of the present disclosure.

An embodiment of the present disclosure provides an interference finding apparatus. As shown in FIG. 6, the apparatus includes a reception module 10 and a measurement module 12.

The reception module 10 is configured to receive measurement configuration information configured by a transmitting device.

The measurement module 12 is configured to perform, according to the measurement configuration information, a receiving measurement on a transmit beam associated with the measurement configuration information, and the receiving measurement includes a received signal strength indicator and/or a channel occupancy. There is a communication connection between the receiving module and the measurement module.

In some embodiments, the apparatus further includes a sending module, which is configured to report a measurement report which is associated with the transmit beam and obtained according to the receiving measurement.

In some embodiments, the apparatus further includes an evaluation module, which is configured to evaluate radio link quality according to the measurement report obtained based on the receiving measurement.

In some embodiments, the evaluation module is configured to determine out-of-synchronization in a case where the measurement report obtained according to the receiving measurement satisfies one of the following conditions that:
 during an evaluation period, the received signal strength indicator obtained according to the receiving measurement is greater than a first received signal strength threshold value, or
 during the evaluation period, the channel occupancy obtained according to the receiving measurement is greater than a first channel occupancy threshold value.

In some embodiments, the apparatus further includes a determination module, which is configured to determine a serviceable beam according to the measurement report obtained based on the receiving measurement, where the serviceable beam satisfies one of the following conditions that:
 the received signal strength indicator obtained according to the receiving measurement is not greater than a second received signal strength threshold value; or
 the channel occupancy obtained according to the receiving measurement is not greater than a second channel occupancy threshold value.

When this embodiment of the present disclosure is implemented, reference may be made to the embodiments one three, and this embodiment has the corresponding technical effects.

Embodiment Six

Figure 7:
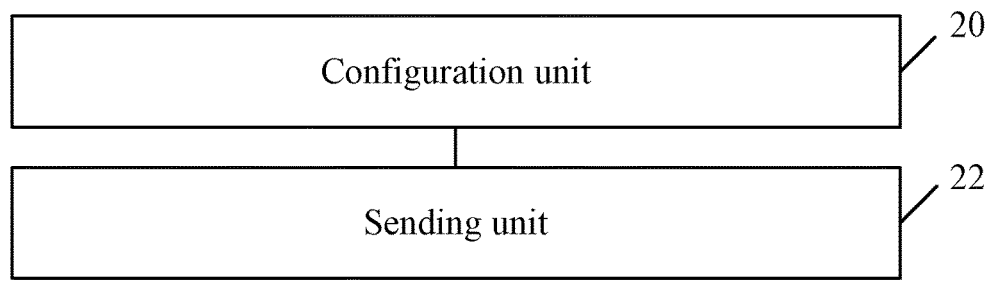
FIG. 7 is a structural diagram of a transmitting device according to an embodiment six of the present disclosure.

An embodiment of the present disclosure provides an interference finding apparatus. As shown in FIG. 7, the apparatus includes a configuration unit 20 and a sending unit 22.

The configuration unit 20 is configured to configure measurement configuration information of a receiving device.

The sending unit 22 is configured to send the measurement configuration information to the receiving device; the measurement configuration information is used for instructing the receiving device to perform a receiving measurement on a transmit beam associated with the measurement configuration information. The receiving measurement includes a received signal strength indicator and/or a channel occupancy. There is a communication connection between the configuration unit and the sending unit.

In some embodiments, the apparatus further includes a reception unit, which is configured to receive a measurement report which is associated with the transmit beam and reported by the receiving device.

In some embodiments, the configuration unit 22 is further configured to configure a threshold value for the receiving device evaluating radio link quality, and the threshold value of the radio link quality includes a first received signal strength threshold value and/or a first channel occupancy threshold value.

In some embodiments, the configuration unit 22 is further configured to configure a threshold value for the receiving device evaluating the transmit beam, and the threshold value of the transmit beam includes a second received signal strength threshold value and/or a second channel occupancy threshold value.

When this embodiment of the present disclosure is specifically implemented, reference may be made to the embodiment four described above, and this embodiment has the corresponding technical effects.

Embodiment Seven

This embodiment of the present disclosure provides a receiving device. The receiving device includes a memory and a processor. The memory is configured to store an interference finding computer program, and the processor executes the computer program to implement steps of the method of any one of the embodiments one to three.

Embodiment Eight

This embodiment of the present disclosure provides a transmitting device. The transmitting device includes a memory and a processor. The memory is configured to store an interference finding computer program, and the processor executes the computer program to implement steps of the method of any one of embodiment four.

Embodiment Nine

A computer-readable storage medium is provided in an embodiment of the present disclosure, where the computer-readable storage medium is configured to store a first interference finding computer program and a second interference finding computer program.

The first computer program is executable by at least one processor to implement the method of any one of the embodiments one to three.

The second computer program is executable by at least one processor to implement the method of any one of the embodiment four.

When the embodiments seven to nine are implemented, reference may be made to the embodiments described above, and the embodiments seven to nine have the corresponding technical effects.

It is to be noted that as used herein, the term "comprising", "including" or any other variant thereof is intended to encompass a non-exclusive inclusion so that a process, method, article or apparatus that includes a series of elements not only includes these elements but also includes other elements that are not expressly listed or are inherent to such a process, method, article or apparatus. In the absence of more restrictions, the elements defined by the statement "including a . . . " do not exclude the presence of additional identical elements in the process, method, article or apparatus that includes the elements.

The serial number in the above embodiments of the present disclosure is for description only and not for the superiority or inferiority of the embodiments.

From the description of the embodiments described above, it will be apparent to those skilled in the art that the method of any embodiment described above may be implemented by means of software plus a general-purpose hardware platform, or may of course be implemented by hardware. Based on this understanding, the technical solution of the present application substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal (which may be a mobile phone, a computer, a server, an air-conditioner, a network device or the like) to execute the method according to each embodiment of the present application.

What is claimed is:

1. An interference finding method, comprising:
receiving measurement configuration information configured by a transmitting device; and
performing, according to the measurement configuration information, a receiving measurement on a transmit beam associated with the measurement configuration information transmitted on an unlicensed spectrum; wherein the receiving measurement comprises at least one of: a received signal strength indicator or a channel occupancy.

2. The method of claim 1, after performing, according to the measurement configuration information, the receiving measurement on the transmit beam associated with the measurement configuration information, further comprising:
reporting a measurement report which is associated with the transmit beam and obtained according to the receiving measurement.

3. The method of claim 1, after performing, according to the measurement configuration information, the receiving measurement on the transmit beam associated with the measurement configuration information, further comprising:
evaluating radio link quality according to a measurement report obtained based on the receiving measurement.

4. The method of claim 3, wherein evaluating the radio link quality according to the measurement report obtained based on the receiving measurement comprises:
determining out-of-synchronization in a case where the measurement report obtained according to the receiving measurement satisfies one of the following conditions:
during an evaluation period, the received signal strength indicator, obtained according to the receiving measurement, being greater than a first received signal strength threshold value; or
during an evaluation period, the channel occupancy, obtained according to the receiving measurement, being greater than a first channel occupancy threshold value.

5. The method of claim 1, after performing, according to the measurement configuration information, the receiving measurement on the transmit beam associated with the measurement configuration information, further comprising:
determining a serviceable beam according to a measurement report obtained based on the receiving measurement; wherein the serviceable beam satisfies one of the following conditions:
the received signal strength indicator, obtained according to the receiving measurement, being not greater than a second received signal strength threshold value; or
the channel occupancy, obtained according to the receiving measurement, being not greater than a second channel occupancy threshold value.

6. A non-transitory computer-readable storage medium, configured to store a first computer program;
wherein the first computer program is executable by at least one processor to implement the method of claim 1.

7. An interference finding method, comprising:
configuring measurement configuration information of a receiving device; and
sending the measurement configuration information to the receiving device; wherein the measurement configuration information is used for instructing the receiving device to perform a receiving measurement on a transmit beam associated with the measurement configuration information transmitted on an unlicensed spectrum, and the receiving measurement comprises at least one of: a received signal strength indicator or a channel occupancy.

8. The method of claim 7, after sending the measurement configuration information to the receiving device, further comprising:
receiving a measurement report which is associated with the transmit beam and reported by the receiving device.

9. The method of claim 7, further comprising:
configuring a threshold value for the receiving device evaluating radio link quality, wherein the threshold value of the radio link quality comprises at least one of: a first received signal strength threshold value or a first channel occupancy threshold value.

10. The method of claim 7, further comprising:
configuring a threshold value for the receiving device evaluating the transmit beam, wherein the threshold value of the transmit beam comprises at least one of: a second received signal strength threshold value or a second channel occupancy threshold value.

11. An interference finding apparatus, comprising a memory and a processor; wherein the memory is configured to store a computer program, and the processor is configured to execute the computer program to perform the method of claim 7.

12. An interference finding apparatus, comprising a memory and a processor; wherein the memory is configured to store a computer program, and the processor is configured to execute the computer program to perform the method of claim 8.

13. An interference finding apparatus, comprising a memory and a processor; wherein the memory is configured to store a computer program, and the processor is configured to execute the computer program to perform the method of claim 9.

14. An interference finding apparatus, comprising a memory and a processor; wherein the memory is configured to store a computer program, and the processor is configured to execute the computer program to perform the method of claim 10.

15. A non-transitory computer-readable storage medium, configured to store a second computer program;
wherein the second computer program is executable by at least one processor to implement the method of claim 7.

16. An interference finding apparatus, comprising:
a processor; and
a memory for storing instructions executable by the processor,
wherein the processor is configured to:
receive measurement configuration information configured by a transmitting device; and
perform, according to the measurement configuration information, a receiving measurement on a transmit beam associated with the measurement configuration information transmitted on an unlicensed spectrum;
wherein the receiving measurement comprises at least one of: a received signal strength indicator or a channel occupancy.

17. The apparatus of claim 16, wherein the processor is further configured to:
report a measurement report which is associated with the transmit beam and obtained according to the receiving measurement.

18. The apparatus of claim 16, wherein the processor is further configured to:
evaluate radio link quality according to a measurement report obtained based on the receiving measurement.

19. The apparatus of claim 18, wherein the processor is configured to determine out-of-synchronization in a case where the measurement report obtained according to the receiving measurement satisfies one of the following conditions:
during an evaluation period, the received signal strength indicator, obtained according to the receiving measurement, being greater than a first received signal strength threshold value; or
during an evaluation period, the channel occupancy, obtained according to the receiving measurement, being greater than a first channel occupancy threshold value.

20. The apparatus of claim 16, wherein the processor is further configured to:
determine a serviceable beam according to a measurement report obtained based on the receiving measurement, wherein the serviceable beam satisfies one of the following conditions:
the received signal strength indicator, obtained according to the receiving measurement, being not greater than a second received signal strength threshold value; or
the channel occupancy, obtained according to the receiving measurement, being not greater than a second channel occupancy threshold value.

* * * * *